Feb. 27, 1945.  F. G. BEUER  2,370,223
BOLT LOCK DEVICE
Filed Nov. 20, 1943

*INVENTOR.*
FREDERICK G. BEUER
BY
*George R. Ericson*

Patented Feb. 27, 1945

2,370,223

UNITED STATES PATENT OFFICE 2,370,223

BOLT LOCK DEVICE

Frederick G. Beuer, St. Louis, Mo., assignor to Carter Carburetor Corporation, St. Louis, Mo., a corporation of Delaware Application November 20, 1943, Serial No. 511,150

2 Claims. (Cl. 151—14)

This invention relates to locking devices for adjustable bolts or screws. Heretofore, bolt or nut locking devices have been provided embodying a spring, the tension of which is varied according to the position of the adjustable bolt or screw. Accordingly, with these devices, the nut or bolt must be threaded into or on its complementary member far enough to provide proper holding tension against the spring and there is no way to adjust the spring tension independently of the relative positioning of the bolt and nut. In other cases, the locking device has been of such character as to damage or distort the locked part so that the part must be replaced if readjustment is desired.

The main object of the present invention is to provide a locking device of the above type in which the resistance imparting spring may be given any predetermined tension independently of the adjustment of the screw or nut, which tension will be maintained indefinitely irrespective of further adjustment of the screw or nut.

This object and other more detailed objects hereafter appearing are attained substantially by the device illustrated in the accompanying drawing in which.

Figure 1:
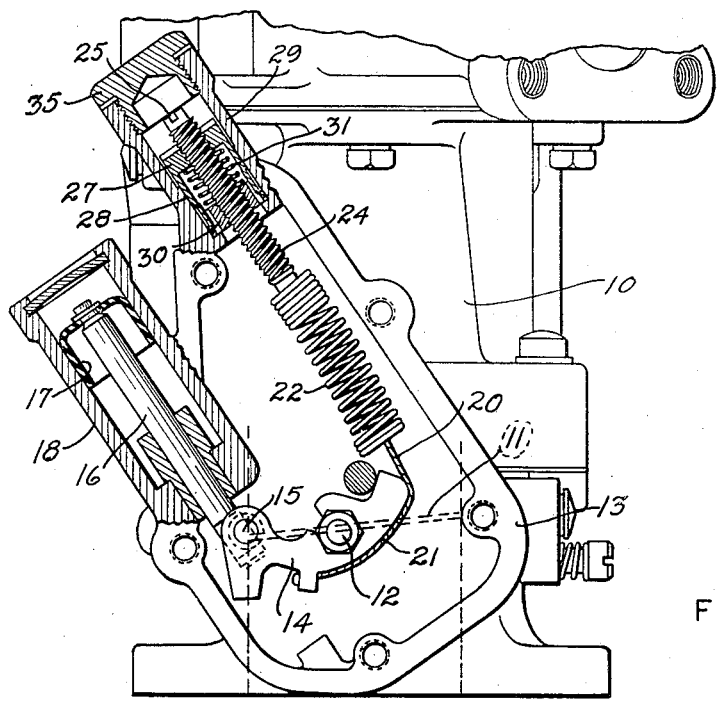
Fig. 1 is a side view of a part of an automotive carburetor with governor attached, parts of the governor being sectioned to illustrate the novel locking device applied thereto.

Fig. 1 shows the lower portion 10 of a downdraft carburetor barrel having an unbalanced throttle valve 11 pivoted therein on a shaft 12. Shaft 12 extends beyond the barrel into the governor casing 13 mounted thereon, the cover of the casing being removed in the figure. A lever 14, rigid with shaft 12 within the casing, has one extremity pinned, as at 15, to a rod 16 carrying piston 17 slidable in dash pot 18 for dampening pulsations of the throttle. A spring strip 20 is attached to an intermediate portion of lever 14 and extends along curved surface 21 thereof and, at its opposite end, is attached to a coiled spring 22. At its upper end, this spring is attached to helical grooves 23 formed on the extremity of a screw 24 having a kerf 25 for receiving a screw driver in adjusting the screw and, consequently, the tension of spring 22.

Screw 24 is threaded into a nut 27 having a cup-shaped extension 28 rotatably received in a cylinder 29 projecting from the governor casing. Screw 24 is also threaded into a second nut 30 received in cup 28 and spaced from nut 27. A coiled spring 31 is compressed between nuts 27 and 30. Cup 28 has axial indentations 32 forming keys for cooperating with slots 33 in nut 30 to prevent relative rotation of nuts 30 and 27, while permitting relative axial movement thereof. A cap 35 closes the end of casing cylinder 29 and may be removed when it is desired to adjust governor spring 22.

Figure 2:
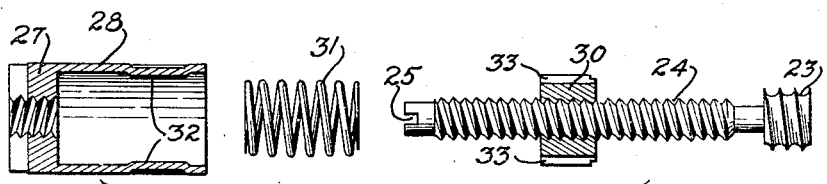
Fig. 2 is a disassembled view showing the parts of the locking device only.
Figure 3:
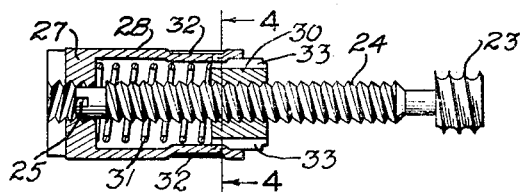
Fig. 3 is a view of the parts in Fig. 2 during adjustment of the tensioning spring.
Figure 4:
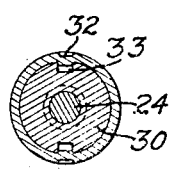
Fig. 4 is a section on line 4—4 of Fig. 3.

In assembling the adjusting screw and its locking device, nut 30 is threaded on screw 24, as shown in Fig. 2, and spring 31 is seated in cup 28. Nut 30 is then inserted into the open end of the cup, with elements 32 and 33 aligned, and pressed inwardly against spring 31 until the threads of the screw and nut 27 are engaged. Since nuts 27 and 30 are held against relative rotation, their positions relative to the screw will remain fixed thereafter as will the tension of spring 31. Spring 31 may be set at any desired tension by merely varying the position of nut 30 on screw 24 prior to threading of the screw into nut 27.

When thus set, spring 31 holds the two nuts against the screw threads at the predetermined tension and resists rotation of the screw due to shocks and vibrations while, however, permitting any desired adjustment of the screw by means of a screw driver inserted in kerf 35, without varying the spring tension. The application of the holding device to a governor, as shown, is, of course, not essential and this device may be used conveniently wherever its advantages would be useful. Moreover, the various parts may be modified in shape and other details as will occur to those skilled in the art and the exclusive use of all modifications as come within the scope of the appended claims is contemplated.

I claim:

1. In a device of the class described, a member formed with a socket, a threaded member connected to and urged in one direction by a normally tensioned spring, an inverted cup member arranged in said socket, one end of said cup member being in threaded engagement with said threaded member, stop means for limiting movement of said cup member by said tensioned spring, a nut on said threaded member, said nut being in splined engagement with said cup member, a coiled spring arranged on said threaded member and interposed between said nut and the inner end wall of said cup member for applying tension to said parts and means for adjusting said threaded member axially of said socket.

2. In a device of the character described, a main housing formed with an opening in its lower end, an annular shoulder projecting from the inner face of said housing and defining said opening, an inverted cup-shaped member arranged in said housing and seated on said shoulder, said cup-shaped member being provided with spline projections and having a threaded opening at its upper end, an elongated screw threaded member threaded through said threaded opening, said screw threaded member being connected at its lower end portion to a normally tensioned spring whereby said cup-shaped member is urged against said shoulder, a nut confined within said tubular housing in threaded engagement with said screw threaded member, said nut having portions in splined engagement with the splines of said side walls, and means for adjusting said tubular housing and said nut on said threaded member to move the latter axially of the housing.

FREDERICK G. BEUER.